July 21, 1936.  J. E. PADGETT  2,048,285

FLUID SHOCK ABSORBER

Filed June 27, 1934  3 Sheets-Sheet 1

INVENTOR
JOSEPH E. PADGETT
Kurs, Hudson & Kent.
ATTORNEYS

July 21, 1936.  J. E. PADGETT  2,048,285
FLUID SHOCK ABSORBER
Filed June 27, 1934  3 Sheets-Sheet 2
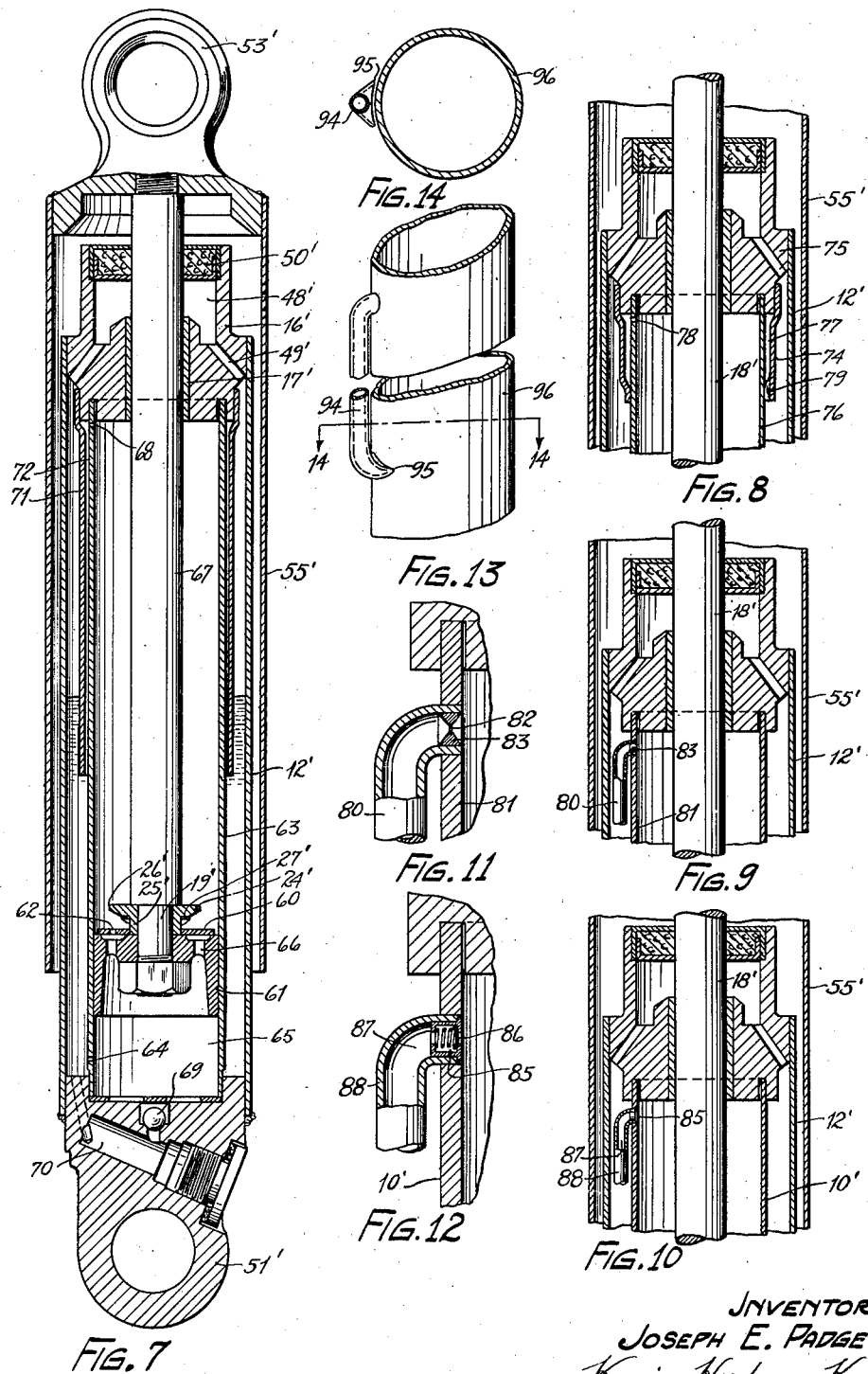
INVENTOR
JOSEPH E. PADGETT
Kwis, Hudson & Kent
ATTORNEYS July 21, 1936.  J. E. PADGETT  2,048,285
FLUID SHOCK ABSORBER
Filed June 27, 1934  3 Sheets-Sheet 3

INVENTOR
JOSEPH E. PADGETT
Kwis, Hudson & Kent
ATTORNEYS

Patented July 21, 1936

2,048,285

UNITED STATES PATENT OFFICE 2,048,285

FLUID SHOCK ABSORBER

Joseph E. Padgett, Toledo, Ohio, assignor, by mesne assignments, to General Motors Corporation, Detroit, Mich., a corporation of Delaware Application June 27, 1934, Serial No. 732,639

24 Claims. (Cl. 188—88)

This invention relates generally to fluid flow shock absorbers, and more particularly to an improved form of double acting shock absorber of this type.

The principal object of this invention is to provide an improved fluid flow shock absorber which is of compact and economical construction and which has very desirable operating characteristics.

Another object of the invention is to provide an improved fluid flow shock absorber of the type having a working cylinder and a reservoir, and a restricted opening through which fluid is forced to produce a shock absorbing action, and wherein means is provided for causing the fluid which is forced through said restricted opening to be returned to the main body of fluid substantially without causing an air emulsion.

Still another object of this invention is to provide an improved shock absorber of the type having a cylinder substantially filled with fluid and a reservoir partially filled with fluid, and a restricted opening for the cylinder at an elevation above the fluid level in the reservoir, and wherein means is provided for directing or returning the fluid which is forced through the restricted opening to the fluid of the reservoir substantially without causing an air emulsion.

It is also an object of this invention to provide an improved shock absorber having a cylinder substantially filled with fluid and a partially filled reservoir, wherein a piston operable in the cylinder draws fluid into the cylinder at one end thereof and discharges fluid from the cylinder through a restricted opening adjacent the other end of the cylinder, and wherein means is provided for returning the fluid which is discharged through said restricted opening to the main body of the fluid in the reservoir substantially without causing an air emulsion.

Other objects and advantages of this invention will be apparent from the following description, when taken in conjunction with the accompanying sheets of drawings, wherein Fig. 1 is a side elevational view showing my improved shock absorber.

Fig. 7 is a longitudinal sectional view similar to Fig. 2 but showing another shock absorber arrangement embodying my invention.

Figs. 8, 9 and 10 are partial sectional views showing other arrangements for the fluid directing means.

Fig. 11 is a sectional view showing the discharge restriction of Fig. 9 on a larger scale.

Fig. 12 is a similar sectional view showing the restricted discharge of Fig. 10 on an enlarged scale.

Fig. 13 is an elevational view showing another form of the fluid directing means.

Fig. 14 is a sectional view thereof taken on line 14—14 of Fig. 13.

Figure 2:
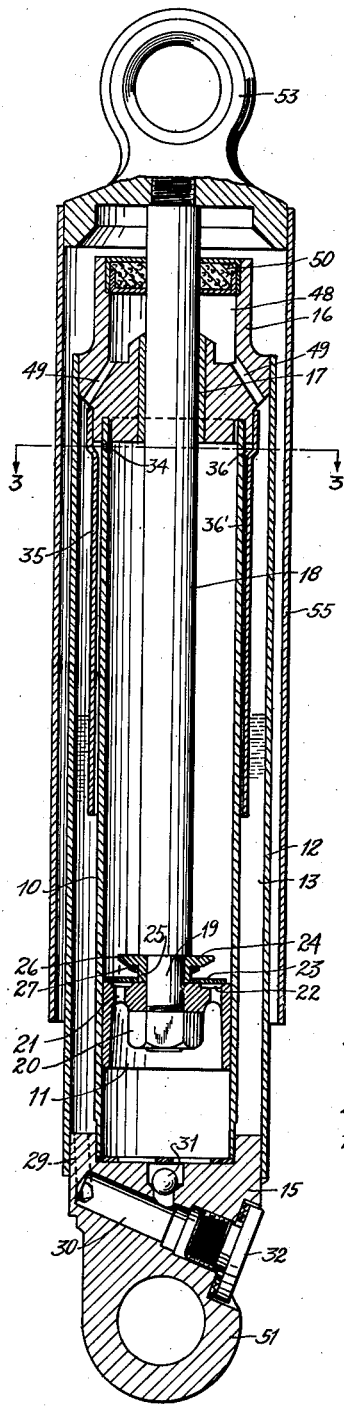
Fig. 2 is a longitudinal sectional view thereof taken substantially on line 2—2 of Fig. 1.
Figure 3:
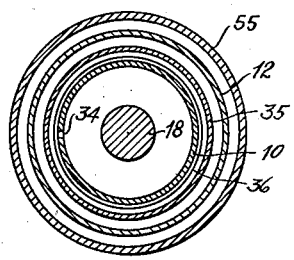
Fig. 3 is a transverse sectional view taken as indicated by line 3—3 of Fig. 2.

In the accompanying drawings, to which detailed reference will now be made, I have shown an improved fluid flow shock absorber of the double acting type, wherein a very desirable shock absorbing characteristic is obtainable substantially without the formation of an air emulsion in the fluid. It will be understood, of course, that the novel combination of my invention may be embodied in various other structural arrangements than those illustrated in the drawings, and that the novel fluid flow control means of my invention may be embodied in many of the shock absorber combinations of the prior art.

Figure 1:
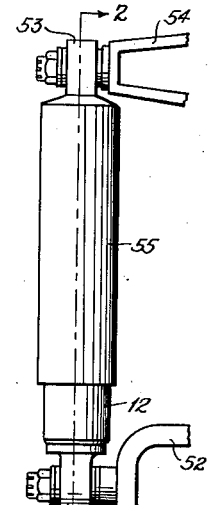

The shock absorber illustrated in Figs. 1 and 2 of the drawings is a double acting shock absorber, having a cylinder barrel 10 in which a reciprocating piston 11 is operable, and a barrel 12 disposed around the cylinder barrel and spaced therefrom to provide a fluid reservoir 13. The cylinder and reservoir barrels 10 and 12 are connected at their lower end with a closure plug 15 which forms the lower end wall of the cylinder and reservoir. The opposite ends of the cylinder and reservoir barrels are connected with a closure plug 16 which forms the upper wall or end of the cylinder and reservoir. The plug 16 may be provided with a suitable bushing 17 in which the piston actuating rod 18 is slidable.

The inner end of the rod 18 may be provided with a reduced portion 19 on which the piston 11 is mounted and retained by means of the nut 20. The piston itself is provided with one or more openings 21 for the passage of fluid upwardly through the piston as the latter is moved downwardly in the cylinder. An annular groove 22 may be formed in the upper surface of the piston to connect the upper ends of the openings 21. Any suitable form of valve means may be provided on the piston for preventing or limiting the flow through the piston on its upward stroke. In this instance I show such valve means as comprising a shiftable plate 23 arranged to seat against the piston body in overlying relation to the groove 22, so as to prevent a downward flow through the piston openings. A spacer 24 may be mounted on the piston rod, with a stem portion 25 of the spacer serving as a guide for the valve plate, and with a flange portion 26 of the spacer serving as an abutment for a spring 27 which may be provided for normally urging the valve plate toward seating engagement with the piston.

At or adjacent the lower end of the working cylinder I provide a passage connecting the lower end of the cylinder with the lower end of the reservoir. This connection may be formed, in part, by an opening 29 and, in part, by a filling opening 30 formed in the plug member 15. A check ball 31 is arranged to control the connecting passage so that fluid may flow into the cylinder from the reservoir, but cannot flow in the reverse direction. A suitable closure screw 32 may be provided in the outer end of the filling opening 30 to seal the same.

At or adjacent the upper end of the working cylinder I provide a restricted opening 34, which may be conveniently formed as a port in the cylinder wall 10 just inwardly of the closure plug 16. The restricted opening 34 allows fluid to be restrictedly discharged from the working cylinder into the reservoir during movement of the piston, to thereby produce a desired shock absorbing action.

When my improved shock absorber has been charged with oil or other suitable fluid and is in an operating condition, the working cylinder is substantially filled with a solid body of the fluid and the reservoir 13 is partially filled with the fluid. Since the restricted opening 34 is located at an elevation which would normally be above the level of the fluid in the reservoir 13, the fluid forced through the restricted opening by the piston would be discharged at high velocity into the relatively large air space of the reservoir before being returned to the main body of fluid in the reservoir. I have found that such high velocity discharge of fluid into the air space of the reservoir while being returned to the main body of fluid usually results in the creation of an undesirable air emulsion.

Therefore, as an important feature of my invention, I have provided means for preventing the fluid, which is forced through the restricted opening, from being released immediately and at high velocity into the air space of the reservoir, which would otherwise result in agitation of the fluid and the creation of an undesirable air emulsion. In attaining this result various means may be provided for dissipating the velocity of the fluid which is forced through the restriction, so that the stream of discharged fluid will be returned to the main body of fluid in the reservoir without such stream of discharged fluid being broken up or diffused and without the main body of reservoir fluid being churned into an emulsion by the discharged fluid being dropped or projected thereinto.

In Fig. 2 of the drawings I have shown one form of such directing or conducting means embodied in my shock absorber and comprising a tubular member 35, which may be supported from the closure plug 16 in surrounding relation to the cylinder barrel 10. This tubular member and the cylinder barrel provide a space or passage therebetween which receives the fluid discharged through the restricted opening 34 and returns the discharged fluid to the main body of fluid in the reservoir. The size and shape of this space may be varied and, as shown in Fig. 2, may have an annular chamber part 36 into which the opening 34 discharges, and a shallow conduit part 36' for conducting or directing the discharged fluid toward the main body of reservoir fluid.

The discharging of the fluid into the relatively small air space of the chamber 36 and the downward travel of the fluid in the conduit 36', causes the velocity of the discharged fluid to be dissipated without permitting the stream of fluid to be broken up. In dissipating the velocity of the fluid discharged through the opening 34, the tubular member 35 causes the fluid to spread out as a film in the shallow conduit 36' and to flow downwardly on the surfaces forming the sides of this conduit. The effect of this action is to allow the discharged fluid to be returned to the main body of fluid in the reservoir with minimum disturbance and with little or no emulsifying action.

The tubular member 35 may be made of a length such that the velocity of the fluid discharged through the restricted opening 34 is dissipated sufficiently to prevent an emulsifying action. In some instances it may be desirable to have the tubular member 35 long enough so that its lower end will always be below the surface of the main body of fluid in the reservoir. This may not always be necessary, however, and in some cases, the tubular member may terminate above the surface of the reservoir fluid.

It is not necessary to my invention that the fluid directing any velocity dissipating means, which cooperates with the restricted opening 34, be in the form of the tubular member 35 shown in Fig. 2, but may, for convenience of manufacture or from the standpoint of results obtained or other reasons, be of various other forms of construction. For example, in Fig. 4 of the drawings I have shown a portion of a shock absorber combination which is identical with that of Fig. 2, but wherein a small tube or pipe 40 is provided instead of the tubular member 35. The tube 40 is arranged with its upper end soldered or otherwise retained in the restricted opening 34' and with its lower end extending downwardly in the reservoir, and terminating below the surface of the reservoir fluid.

Figure 6:
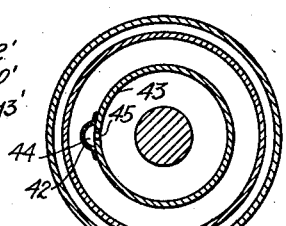
Fig. 6 is a cross-sectional view similar to Fig. 5 but showing another form of directing means for the restricted discharge fluid.

In Fig. 6 of the drawings I have shown another member 42, which may be applied to the wall of the cylinder 43 to form a conducting and velocity dissipating passage 44 for the fluid which is discharged through the restricted opening 45. The member 42 may be a channel-shaped sheet metal member which is closed at its upper end and is soldered or otherwise secured to the cylinder wall to form a conducting passage similar to that provided by the tube 40 of Fig. 4.

To prevent the loss of fluid from the cylinder through the piston rod bushing 17 of Fig. 1 I provide the closure plug 16 with a leakage collecting chamber 48. When fluid leaks past the piston rod bushing 17 it is collected in the chamber 48 and is returned to the reservoir through the drain openings 49. A suitable packing 50 may also be provided on the closure plug 16 for scraping fluid from the piston rod and for preventing the entry of dirt or other foreign matter.

The closure plug 15 may be provided with a connecting eye 51 for attaching the lower end of the shock absorber to a bracket 52 of the vehicle chassis, and likewise the upper end of the piston rod 18 may be provided with a suitable eye 53 which is adapted to be connected to a bracket 54 of the vehicle chassis. If desired, a tubular dust guard 55 may be mounted on the eye 53 to extend downwardly in telescoping relation around the reservoir barrel 12.

In the operation of the device illustrated in Fig. 2, the piston 11 is moved downwardly in the cylinder when the axle and vehicle body approach each other. During this downward stroke the piston is moved toward what may conveniently be called the low pressure end of the cylinder and causes the check ball 31 to be seated. The fluid contained in the cylinder below the piston is thus forced upwardly through the piston openings 21 and past the valve plate 23 which is unseated by the flow of fluid. The movement of the piston rod 18 into the cylinder also causes some fluid to be displaced from the cylinder, and since the check ball 31 is seated on the down stroke of the piston the rod displacement must be discharged through the restricted opening 34. The shock absorbing action produced on the down stroke of the piston is thus obtained in part from the resistance to flow of fluid upwardly through the piston openings and past the valve 23, and in part from the restricted discharge of the fluid displaced by the rod 18. The degree of shock absorbing action desired on the downward stroke of the piston may be obtained by appropriately selecting the size and number of the piston openings 21, as well as the resistance which the valve plate 23 is to offer to the upward flow of fluid, and also by appropriately selecting the area of the restricted opening 34.

When the vehicle body and axle separate, the piston 11 is moved upwardly in the cylinder toward the high pressure end thereof and, during this upward or rebound stroke, the valve plate 23 is seated against the piston and the fluid trapped in the cylinder above the piston is discharged through the restricted opening 34 into the reservoir. The area of the restricted opening 34 is the main factor in determining the shock absorbing action which is obtained on the upward stroke of the piston. The upward stroke of the piston also allows or causes the check ball 31 to be unseated and a relatively free return flow of fluid takes place from the reservoir into the cylinder through the passage 29, 30.

In Fig. 7 of the drawings I have shown a shock absorber which is generally similar to that illustrated in Fig. 2, but wherein the check valve plate 60 of the piston 61 may be provided with a restricted opening 62 and wherein the lower end of the working cylinder 63 may be provided with a restricted opening 64 which communicates with the lower end of the reservoir 65. Aside from the restricted openings 62 and 64, the shock absorber of Fig. 7 is the same as the shock absorber shown in Fig. 2, but, as will be explained hereinafter, the provision of these two restricted openings produces a somewhat different shock absorbing function than is obtained from the shock absorber of Fig. 2.

Assuming that the shock absorber of Fig. 7 has been charged with fluid and is in operating condition, the downward movement of the piston causes some of the fluid which is contained in the cylinder below the piston to be forced upwardly through the piston openings 66 and past the valve plate 60 which is unseated by the flow of fluid and also causes some of the fluid, contained in the cylinder below the piston, to be discharged into the reservoir through the restricted opening 64. In addition to this, the fluid which is displaced from the cylinder by the piston rod 67 moving thereinto, is discharged either through a restricted opening 68 corresponding with the restricted opening 34 of the shock absorber of Fig. 2, or through the restricted opening 64, or partly through each of the openings 64 and 68.

Thus it will be seen that as the piston moves downwardly toward the low pressure end of the cylinder, a shock absorbing action is obtained by the restricted discharge of fluid through the openings 64 and 68, and by the resistance which the piston openings 66 and the valve plate 60 offer to the flow of fluid upwardly past the piston.

During the rebound stroke of the piston or, in other words, during movement of the piston toward the upper or high pressure end of the cylinder, the valve plate 60 is seated against the piston body and the fluid which is trapped in the cylinder above the piston can be discharged only through the restricted opening 62 and the restricted opening 68. The restricted discharge of fluid through these openings produces a shock absorbing action the value of which is determined largely by the combined area of these two restricted openings.

During the downward stroke of the piston described above, the check valve 69 is seated to prevent fluid from being displaced into the reservoir through the opening 70 and on the upward stroke of the piston the check valve 69 is unseated to allow a relatively free return flow of fluid from the reservoir into the cylinder.

A tubular member 71, similar to the tubular member 35 of the shock absorber of Fig. 2, may be disposed around the cylinder barrel 63 to provide a conducting and velocity dissipating passage or chamber 72 which receives the fluid discharged through the restricted opening 68 and returns the same to the main body of the reservoir fluid so that, as explained above, an objectionable emulsifying action is eliminated.

If desired, the fluid directing means may be in the form of a relatively short tubular member, which as shown in Fig. 8, may be mounted on the upper closure plug 75 and arranged to extend downwardly around the cylinder barrel 76. The tubular member is of such diameter that a space or chamber 77 is provided between the same and the cylinder to receive the fluid discharged through the restricted opening 78. The size and shape of this space or chamber is such that the fluid discharged through the restricted opening 78 enters a relatively small air space and its velocity is dissipated therein without the stream of fluid having an opportunity to form an air emulsion.

The lower end of the chamber 77 may be left open or, if desired, the lower end of the tubular member 74 may be deflected inwardly to engage the cylinder barrel 76 to thereby form a closure for the lower end of this chamber, in which case an opening 79 of suitable size and shape may be provided through the lower portion of the tubular member, preferably on the side thereof opposite the restricted opening 78. The opening 79 may be formed as a slot or cut-away portion or as a radially bulged portion, which as the case may be, extends for a short distance circumferentially of the member 74. The open lower end of the chamber 77 or the opening 79 thereof, as the case may be, allows the fluid which has been discharged into the chamber to flow downwardly as a film on the surface of the cylinder 76 into the reservoir fluid.

Figure 4:
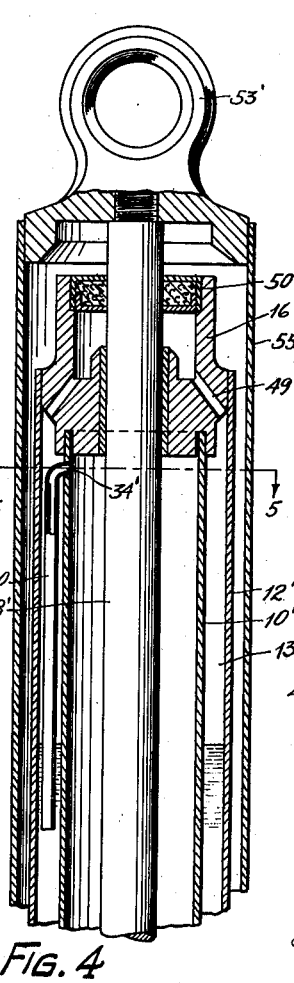
Fig. 4 is a partial elevational view showing the same shock absorber combination as is shown in Fig. 2, but with a different form of directing means for the restricted discharge of fluid from the cylinder.

In Figs. 9 and 11 of the drawings I have shown a fluid conducting and velocity dissipating member 80 which is similar to the corresponding member 40 shown in Fig. 4 of the drawings. The tubular member 80 may be provided with a curved upper end which may be soldered or otherwise retained in an opening provided in the upper end of the cylinder barrel 81 similar to what is shown in Fig. 4, but in Figs. 9 and 11 the restricted opening, with which the tubular member cooperates, is shown as being a thin edged orifice 82. This orifice may be conveniently formed in a plug member 83, which is retained in the opening of the tubular member, such as by counterboring the plug member 83 from one or both sides thereof so as to leave a thin web of material through which the orifice 82 is formed. The provision of such a thin edged orifice in the restricted cylinder opening allows the restricted discharge of fluid to take place substantially independently of viscosity changes in the fluid. The elimination of viscosity effects in the restricted cylinder opening is very desirable because it permits a more uniform shock absorbing action to be obtained. It should be understood, that the restricted cylinder openings in any of the shock absorbers herein described may be constructed or provided with a thin edged orifice so that the beneficial effects explained in connection with the construction of Figs. 9 and 11 may be obtained.

In the case of some shock absorbers embodying my invention it may be desirable to provide the restricted opening at the high pressure end of the cylinder with a check valve or fluid pressure actuated valve arranged to open toward the reservoir. Such a valve may be desirable to prevent the discharge of fluid from the cylinder until the pressure therein has built up to a desired predetermined value.

In Figs. 10 and 12 of the drawings I have shown such a check valve 85 associated with the restricted opening 86 at the high pressure end of the cylinder and arranged in the fluid conducting and velocity dissipating passage 87 which communicates with the restricted opening. Any suitable form of check valve may be used for this purpose and, in this instance, I show a check valve 85, which is constructed as a unit and is mounted in the upper end of a tubular member 88 which may be similar to the tubular member 40 of Fig. 4.

The check valve feature just described may, if desired, be used in conjunction with the restricted cylinder opening and fluid conducting means of any of the shock absorber arrangements herein disclosed.

Figure 5:
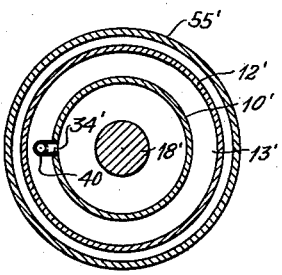
Fig. 5 is a cross-sectional view taken as indicated by line 5—5 of Fig. 4.

When the deflecting or conducting means is constructed as a small tube or pipe, as shown in Figs. 4 to 6 inclusive and 9 to 12 inclusive, it is desirable that the tube extend into the body of reservoir fluid so that the fluid discharged through the tube will not drop upon or be projected against the surface of the reservoir fluid. If the conducting tube or pipe, such as the pipe 94, terminates above the surface of the reservoir fluid it is desirable that the tube be provided at its discharge end with a deflector or spreader part such as the deflector part 95 shown in Figs. 13 and 14. This deflector part may have any desired shape or location such that it will cause the fluid to form a film on the surface of the cylinder barrel 96 and thus permit the discharged fluid to return to the reservoir fluid without causing an emulsion. As shown in Figs. 13 and 14, this deflector part may be formed by flattening or bending the lower end of the tube and thereby giving it a shape which is capable of producing the desired result.

Figure 15:
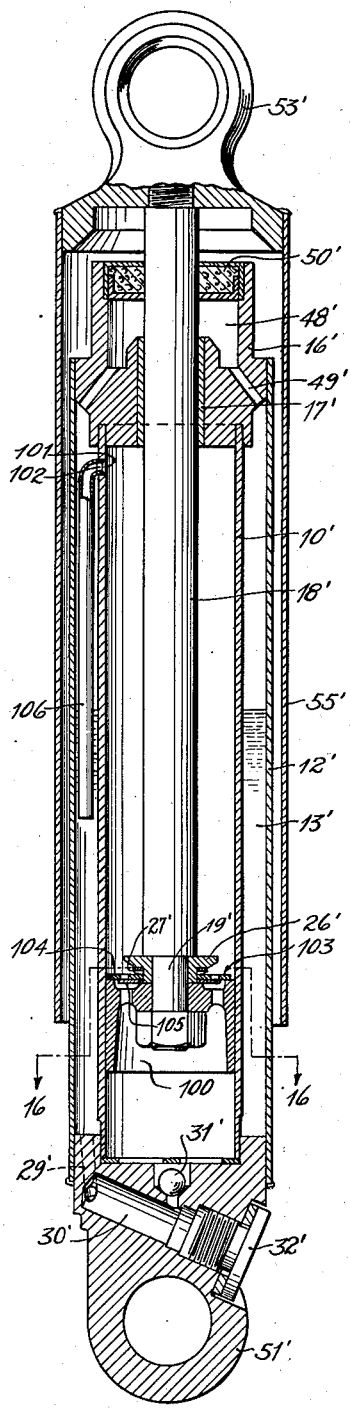
Fig. 15 is a sectional view similar to Fig. 2 but showing another shock absorber embodying my invention.
Figure 16:
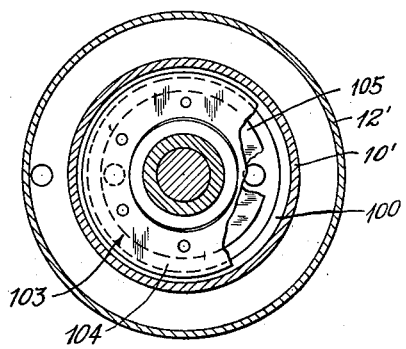
Fig. 16 is a cross-section thereof taken on line 16—16 of Fig. 15.

In Figs. 15 and 16 of the drawings I have shown a shock absorber of the type illustrated in Fig. 2, but having spring loaded valves for the piston 100 and the restricted opening 101. The valve 102 for the restricted opening 101 may be a check valve such as that illustrated in Fig. 12. The spring loaded valve for the piston may be of any suitable construction, for example it may be a disk valve structure 103 as herein illustrated. The piston valve 103 is more fully disclosed in copending application Serial No. 692,628, filed October 7, 1933, but for purposes of the present disclosure this valve comprises a rigid disk 104 having one or more holes therethrough and a flexible disk 105 which controls the holes of the rigid disk and is adapted to be flexed by the fluid pressure acting through the holes of the rigid disk on the up stroke of the piston. Except for the valves 102 and 103 and the conducting pipe 106, the shock absorber of Fig. 15 is similar to the shock absorber of Fig. 2 and the corresponding parts are designated in Figs. 15 and 16 by primed reference characters.

Figure 17:
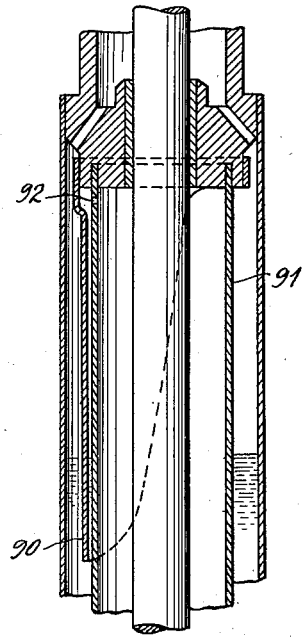
Fig. 17 is a partial sectional view showing the fluid deflecting means as comprising a baffle.

Instead of constructing the deflecting means as a tubular member extending around the cylinder as shown in Figs. 2, 7 and 8, it may be simply a baffle plate of such extent and shape as is needed to cause the discharged fluid to be spread out into a film while it is being returned to the reservoir fluid. In Fig. 17 of the drawings I have shown a baffle plate 90 of this character which is curved to extend only a part of the way around the cylinder 91. The fluid which is discharged through the opening 92 is baffled and spread out as a film on the wall of the cylinder and is returned to the reservoir fluid substantially without emulsification.

From the foregoing description and accompanying drawings it will now be readily seen that I have provided a novel shock absorber combination which is of very economical construction and which is capable of rendering very satisfactory and efficient service. It will be understood, furthermore, that the improved shock absorber that I have provided includes a restricted discharge opening at the high pressure end of the cylinder and means for returning the fluid, which is discharged through the restricted opening, to the main body of the fluid substantially without objectionable emulsification of the fluid.

Having thus described my invention, I claim:

1. In a shock absorber the combination of a housing having a plurality of chambers therein, a body of fluid in said housing substantially filling one of said chambers and partially filling the other, said housing having a restricted opening therein at an elevation above the level of the fluid in the partially filled chamber, means for forcing fluid through said restricted opening, and means for spreading the restrictedly discharged fluid out into substantially a film and thereby returning such fluid to the main body of fluid substantially without forming an air emulsion.

2. In a shock absorber the combination of a housing having therein a cylinder and a reservoir, fluid in said cylinder and reservoir, a piston in said cylinder for cooperating with the fluid, said cylinder having a restricted opening through which fluid may be forced by the piston, and means cooperating with a wall of the reservoir for causing the fluid which is forced through said restricted opening to be spread out into substantially a film and returned to the reservoir fluid substantially without causing an air emulsion.

3. In a shock absorber the combination of a housing having therein a cylinder and a reservoir, a body of fluid in the housing substantially filling said cylinder and partly filling said reservoir, a piston in said cylinder for cooperation with the fluid, a check valve associated with the piston, said cylinder having a restricted opening through which fluid is forced by the piston, said cylinder opening being above the fluid level in the reservoir, and means cooperating with at least a portion of the wall of the cylinder for providing a conduit for returning the fluid which is discharged through said restricted opening to the reservoir fluid substantially without causing an air emulsion.

4. In a shock absorber the combination of a housing having therein a cylinder and a reservoir, a body of fluid in the housing substantially filling said cylinder and partly filling said reservoir, a restricted opening in the cylinder above the level of the fluid in the reservoir, a valved piston operable in said cylinder and adapted to force fluid through said restricted opening, means providing for a return flow of fluid into the cylinder at a point spaced from said restricted opening, and means cooperating with at least a portion of the wall of the cylinder for returning the fluid which has been forced through the restricted opening to the reservoir fluid substantially as a film and without causing an air emulsion.

5. In a shock absorber the combination of a housing having therein a cylinder and a reservoir, a body of fluid in the housing substantially filling the cylinder and partially filling said reservoir, a restricted opening in the cylinder above the level of the fluid in the reservoir, a piston operable in said cylinder and adapted to force fluid through said restricted opening, a check valve arranged to return fluid to the cylinder from the reservoir, a check valve on said piston arranged to seat on movement of the piston toward the restricted opening, and fluid directing means in the reservoir for returning the fluid discharged through said restricted opening to the reservoir fluid.

6. In a shock absorber the combination of a cylinder having a high pressure end and a low pressure end, a reservoir, fluid in said cylinder and reservoir, said cylinder having a restricted opening communicating with the high pressure end thereof, a piston operable in said cylinder for forcing fluid through the restricted opening into the reservoir, means adjacent the low pressure end of the cylinder for admitting fluid to the cylinder from the reservoir but preventing flow in the reverse direction, and means for dissipating the velocity of the discharged fluid and returning the same to the reservoir fluid.

7. In a shock absorber the combination of a cylinder having a high pressure end and a low pressure end, a reservoir, fluid in said cylinder and reservoir, said cylinder having a restricted opening communicating with the high pressure end thereof, a piston operable in said cylinder for forcing fluid through the restricted opening into the reservoir, means adjacent the low pressure end of the cylinder for admitting fluid to the cylinder from the reservoir but preventing flow in the reverse direction, and means in the reservoir cooperating with said restricted opening for returning the fluid discharged therethrough to the reservoir fluid substantially without causing an emulsion.

8. In a shock absorber the combination of a cylinder having a high pressure end and a low pressure end, a reservoir, fluid in said cylinder and reservoir, said cylinder having a restricted opening communicating with the high pressure end thereof, a piston in said cylinder, a rod extending into the high pressure end of the cylinder for actuating the piston, said piston being effective for forcing fluid through said restricted opening upon movement of the piston toward the high pressure end and said rod being effective for displacing fluid through said restricted opening upon movement of the piston toward the low pressure end, and a check valve adjacent the low pressure end arranged to admit fluid to the cylinder from the reservoir.

9. In a shock absorber the combination of a housing having therein a cylinder and a reservoir, a body of fluid in the housing substantially filling the cylinder and partially filling the reservoir, a restricted opening in the cylinder above the level of the fluid in the reservoir, a piston operable in said cylinder and adapted to force fluid through said restricted opening, a check valve for returning fluid to the cylinder from the reservoir below the piston, said restricted opening being a thin-edged orifice, and means for dissipating the velocity of the fluid discharged through said orifice to decrease the tendency to create an air emulsion.

10. In a shock absorber the combination of a housing having therein a cylinder and a reservoir, a body of fluid in the housing substantially filling the cylinder and partially filling the reservoir, a restricted opening in the cylinder above the level of the fluid in the reservoir, a piston operable in said cylinder and adapted to force fluid through said restricted opening, a check valve for returning fluid to the cylinder from the reservoir below the piston, means in the reservoir providing a conduit for returning the fluid, which is discharged through said restricted opening, to the reservoir fluid, and a check valve controlling the flow through said restricted opening and arranged to open toward the reservoir.

11. In a shock absorber the combination of a housing having therein a cylinder and a reservoir, a body of fluid in the housing substantially filling the cylinder and partially filling the reservoir, a restricted opening in the cylinder above the level of the fluid in the reservoir, a second restricted opening connecting the cylinder and reservoir at a point remote from the first mentioned restricted opening, a piston in the cylinder between the restricted openings and operable to force fluid through the same into the reservoir, a check valve associated with the second restricted opening to permit a relatively free return flow of fluid into the cylinder, and means for dissipating the velocity of the fluid discharged through the first mentioned restricted opening.

12. In a shock absorber the combination of a housing having therein a cylinder and a reservoir, a body of fluid in the housing substantially filling the cylinder and partially filling said reservoir, a restricted opening in the cylinder above the level of the fluid in the reservoir, a piston operable in said cylinder and adapted to force fluid through said restricted opening, a check valve arranged to return fluid to the cylinder from the reservoir, valve means on said piston arranged to permit a relatively freer flow of fluid past the piston on movement of the same away from said restricted opening and a relatively more restricted flow past the piston on movement of the same toward said restricted opening, and means for returning the fluid which is discharged through said restricted opening to the reservoir fluid including means for reducing the velocity of such discharged fluid.

13. In a shock absorber the combination of a housing having therein a cylinder and a reservoir, a body of fluid in the housing substantially filling the cylinder and partially filling the reservoir, a restricted opening in the cylinder above the level of the fluid in the reservoir, a second restricted opening connecting the cylinder and reservoir at a point remote from the first mentioned restricted opening, a piston in the cylinder between the restricted openings and operable to force fluid into the reservoir, a check valve associated with the second restricted opening to permit a relatively free return flow of fluid into the cylinder, valve means on said piston arranged to permit a relatively restricted flow of fluid past the piston on movement of the same toward the first mentioned restricted opening and a relatively freer flow past the piston on movement of the same toward the second restricted opening, and means for dissipating the velocity of the fluid discharged through the first mentioned restricted opening.

14. In a shock absorber the combination of a housing having therein a cylinder and a reservoir, a body of fluid substantially filling said cylinder and partially filling said reservoir, said cylinder having a restricted opening communicating with the reservoir below the surface of the reservoir fluid and a restricted opening communicating with the reservoir about the surface of the reservoir fluid, a piston operable in said cylinder and adapted to force fluid through one of said openings on movement in one direction and through the other restricted opening on movement in the other direction, and means cooperating with the second restricted opening for returning the fluid which is discharged therethrough to the reservoir fluid substantially without creating an air emulsion.

15. In a shock absorber the combination of a housing having therein a cylinder and a reservoir, fluid in said cylinder and reservoir, said cylinder having a restricted opening adjacent the high pressure end thereof, a piston operable in said cylinder for forcing fluid through said restricted opening, means for returning fluid to the cylinder from the reservoir below the piston, and means for returning the fluid which is discharged through the restricted opening to the reservoir fluid including means providing a velocity dissipating chamber communicating with said restricted opening.

16. In a shock absorber the combination of a housing having therein a cylinder and a reservoir, fluid in said cylinder and reservoir, said cylinder having a restricted opening adjacent the high pressure end thereof, a piston operable in said cylinder for forcing fluid through said restricted opening, means for returning fluid to the cylinder from the reservoir below the piston, means providing a chamber arranged to receive fluid discharged through said restricted opening, and means providing a passage for conducting the discharged fluid from said chamber to the reservoir fluid.

17. In a shock absorber the combination of a housing having therein a cylinder and a reservoir, fluid in said cylinder and reservoir, said cylinder having a restricted opening adjacent the high pressure end thereof, a piston operable in said cylinder for forcing fluid through said restricted opening, means for returning fluid to the cylinder from the reservoir below the piston, and means for dissipating the velocity of the discharged fluid and returning the fluid to the reservoir fluid including means cooperating with the restricted opening to cause the discharged fluid to be spread out into substantially a film.

18. In a shock absorber the combination of a housing having a cylinder therein and a reservoir around the cylinder, fluid in said cylinder and reservoir, said cylinder having a restricted opening adjacent its upper end, a piston operable in said cylinder for forcing fluid through said restricted opening into the reservoir, means providing for a flow of fluid into the cylinder from the reservoir below the piston, and tubular means disposed around said cylinder and adapted to direct the fluid, which is discharged through the restricted opening, toward the body of reservoir fluid.

19. In a shock absorber the combination of a housing having a cylinder therein and a reservoir around the cylinder, fluid in said cylinder and reservoir, said cylinder having a restricted opening adjacent its upper end, a piston operable in said cylinder for forcing fluid through said restricted opening into the reservoir, means providing for a flow of fluid into the cylinder from the reservoir below the piston, and tubular means disposed around said cylinder with a space therebetween for returning the fluid, which is discharged through the restricted opening, to the reservoir fluid substantially without causing an air emulsion.

20. In a shock absorber the combination of a housing having a cylinder therein and a reservoir around the cylinder, fluid in said cylinder and reservoir, said cylinder having a restricted opening adjacent its upper end, a piston operable in said cylinder for forcing fluid through said restricted opening into the reservoir, means providing for a flow of fluid into the cylinder from the reservoir below the piston, a tubular member disposed around said cylinder with a space therebetween, and means supporting said tubular member such that the fluid discharged through said restricted opening must travel through at least a portion of said space to reach the body of reservoir fluid.

21. In a shock absorber the combination of a housing having a cylinder therein and a reservoir around the cylinder, fluid in said cylinder and reservoir, said cylinder having a restricted opening adjacent its upper end, a piston operable in said cylinder for forcing fluid through said restricted opening into the reservoir, means providing for a flow of fluid into the cylinder from the reservoir below the piston, a tubular member disposed around said cylinder with a space therebetween, and means substantially closing said tubular member at the upper end thereof whereby the fluid which is discharged through said restricted opening is prevented, from returning to the reservoir fluid except through said space.

22. In a shock absorber the combination of a cylinder having a high pressure end and a low pressure end, a reservoir, fluid in said cylinder and reservoir, means providing a flow restricting passage connecting said high pressure end and said reservoir, means providing a constantly open flow restricting passage connecting said low pressure end and the reservoir, a piston operable in said cylinder and adapted upon movement in one direction to force fluid through the first mentioned restricting passage and upon movement in the opposite direction to force fluid through the second mentioned constantly open restricting passage, and valve means adjacent the low pressure end supplementing the second mentioned constantly open restricting passage to permit a relatively free additional return flow of fluid from the reservoir into said low pressure end.

23. In a shock absorber the combination of a cylinder, a reservoir, fluid in the cylinder and reservoir, means providing a constantly open flow restricting conduit connecting each end of the cylinder with the reservoir and communicating with the reservoir below the level of the fluid therein, a double acting piston operable in said cylinder for producing a shock absorbing action and adapted upon movement in one direction to force fluid through one constantly open restricting conduit and upon movement in the other direction to force fluid through the other constantly open restricting conduit, and a check valve supplementing the constantly open restricting connection at one end of the cylinder and operable to permit a relatively free additional return flow of fluid from the reservoir.

24. In a shock absorber the combination of a cylinder, a reservoir, fluid in the cylinder and reservoir, means providing a constantly open flow restricting conduit connecting each end of the cylinder with the reservoir and communicating with the reservoir below the level of the fluid therein, a double acting piston operable in said cylinder for producing a shock absorbing action and adapted upon movement in one direction to force fluid through one restricting conduit and upon movement in the other direction to force fluid through the other restricting conduit, a check valve on said piston, and a check valve supplementing the restricting connection at one end of the cylinder and operable to permit a relatively free return flow of fluid from the reservoir in addition to the restricted flow provided by said other restricting conduit.

JOSEPH E. PADGETT.